United States Patent
Kleijn et al.

(10) Patent No.: US 9,086,475 B2
(45) Date of Patent: Jul. 21, 2015

(54) SELF-LOCALIZATION FOR A SET OF MICROPHONES

(71) Applicants: Willem Bastiaan Kleijn, Lower Hutt (NZ); Nikolay D. Gaubitch, CD Delft (NL); Richard Heusdens, GA Delft (NL)

(72) Inventors: Willem Bastiaan Kleijn, Lower Hutt (NZ); Nikolay D. Gaubitch, CD Delft (NL); Richard Heusdens, GA Delft (NL)

(73) Assignee: GOOGLE INC., Mountain, View, CA (US)

( * ) Notice: Subject to any disclaimer, the term of this patent is extended or adjusted under 35 U.S.C. 154(b) by 78 days.

(21) Appl. No.: 13/746,333

(22) Filed: Jan. 22, 2013

(65) Prior Publication Data
US 2014/0204716 A1 Jul. 24, 2014

(51) Int. Cl.
G01S 3/80 (2006.01)
G01S 5/18 (2006.01)
G01S 5/02 (2010.01)

(52) U.S. Cl.
CPC ... *G01S 3/80* (2013.01); *G01S 5/18* (2013.01); *G01S 5/0278* (2013.01); *G01S 5/0289* (2013.01)

(58) Field of Classification Search
CPC ........... G01S 3/80; G01S 5/18; G01S 5/0278; G01S 5/0289
USPC ......................................... 367/127
See application file for complete search history.

(56) References Cited

U.S. PATENT DOCUMENTS

| | | | |
|---|---|---|---|
| 2008/0170717 A1* | 7/2008 | Liu et al. | 381/92 |
| 2014/0204716 A1* | 7/2014 | Kleijn et al. | 367/127 |

FOREIGN PATENT DOCUMENTS

| | | | | |
|---|---|---|---|---|
| WO | WO 2014-116645 | * | 7/2014 | G01S 5/18 |

OTHER PUBLICATIONS

Raykar et al.; Position Calibration of Microphones and Loudspeakers in Distributed Computing Platforms; Jan. 2005; pp. 70-83.*
Pertila et al.; Closed-Form Self-Localization of Asynchronous Microphone Arrays; Jun. 2011; pp. 139-144.*
M. Crocco et al., "A Bilinear Approach to the Position Self-Calibration of Multiple Sensors", IEEE Transactions on Signal Processing, vol. 60, No. 2, Feb. 2012.
M. Crocco et al., "A Closed Form Solution to the Microphone Position Self-Calibration Problem", IEEE International Conference on Acoustics, Speech and Signal Processing (ICASSP), Mar. 2012.
R. Biswas et al. "A Passive Approach to Sensor Network Localization", IEEE/RSJ International Conference on Intelligent Robots and Systems (IROS), vol. 2, Sep. 2004.
V. C. Raykar et al., "Position Calibration of Microphones and Loudspeakers in Distributed Computing Platforms", IEEE Transactions on Speech and Audio Processing, vol. 13, No. 1, Jan. 2005.

(Continued)

*Primary Examiner* — Daniel Pihulic
(74) *Attorney, Agent, or Firm* — Birch, Stewart, Kolasch & Birch, LLP

(57) ABSTRACT

Provided are methods and systems for finding the location of sensors (e.g., microphones) with unknown internal delays based on a set of events (e.g., acoustic events) with unknown event time. A localization algorithm may iteratively run to compute the acoustic event times, the observation delays, and the relative locations of the events and the sensors.

18 Claims, 3 Drawing Sheets

(56) References Cited

OTHER PUBLICATIONS

Y. Weiss et al., "Affine Structure From Sound", Advances in Neural Information Processing Systems 18, pp. 1353-1360, (2006).

Pasi Pertila et al., "Closed-Form Self-Localization of Asynchronous Microphone Arrays", 2011 Joint Workshop on Hands-Free Speech Communication and Microphone Arrays, IEEE, May 30, 2011-Jun. 1, 2011, pp. 139-144.

* cited by examiner

SELF-LOCALIZATION FOR A SET OF MICROPHONES

TECHNICAL FIELD

The present disclosure generally relates to methods and systems for signal processing. More specifically, aspects of the present disclosure relate to determining locations of sensors based on their observation of a set of events.

BACKGROUND

For various applications it is useful to determine the relative localization of a number of sensors. In the case of sensors, this allows the determination of spatial information about the sensed signal. Useful information can also be obtained from determining the location of a set of microphones. For example, such information can be used to determine the location of sound sources producing the audio being captured by the microphones. The information can also be used to separate sound signals produced by different sounds sources, such as talking persons or musical instruments. In such a scenario, knowledge of the location of the microphones facilitates the usage of physical models, likely providing an advantage over separation methods that do not require the scenario to be physically plausible.

For example, imagine a set of microphones (e.g., mobile telephones or Smartphones) are in a room. The basic problem is to compute their location from their observation of a set of acoustic events. A number of solutions to these basic problems have been proposed. However, these proposed solutions either do not consider unknown internal delays at the microphone (referred to herein as "observation delays"), or they suffer from local minima far away from the true solution.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

At least one embodiment of the present disclosure relates to a method comprising: measuring observation times of a set of events at a set of sensors; generating initial estimates for internal delays of the sensors and event times of the events; performing an iterative approximation algorithm to find a rank-3 approximation of the internal delays and event times using a criterion; and computing locations of the sensors using the rank-3 approximation of the internal delays and event times.

Another embodiment relates to the method further comprising using the locations of the sensors to determine locations of one or more mobile telephones.

Another embodiment relates to the method further comprising computing locations of the acoustic events using the rank-3 approximation of the internal delays and event times.

Yet another embodiment relates to the method further comprising using the global solution as an initial value for an iterative maximum-likelihood algorithm to find a global minimum.

Still another embodiment relates to the method further comprising using the global solution as an initial value for an iterative maximum-likelihood algorithm to minimize a squared error criterion.

In one or more other embodiments of the present disclosure, the method may optionally include one or more of the following additional features: the set of events is a set of acoustic events, and the set of sensors is a set of microphones; one or more of the acoustic events is generated by human with hand claps or speech; one or more of the acoustic events is generated by a device with a loudspeaker; the device is a telephone; one or more of the sensors are microphones located on mobile telephones; the localization of the sensors is for the purpose of near-field beam-forming; the localization of the sensors is used to identify talkers in a conference call; the localization of the sensors is used as a basis for the enhancement of recorded audio signals; the iterative approximation algorithm converges to a global solution for the internal delays and the event times; the criterion is selected to facilitate finding a global solution; the criterion is the Frobenius norm; and/or each step of the iterative approximation algorithm minimizes the criterion.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
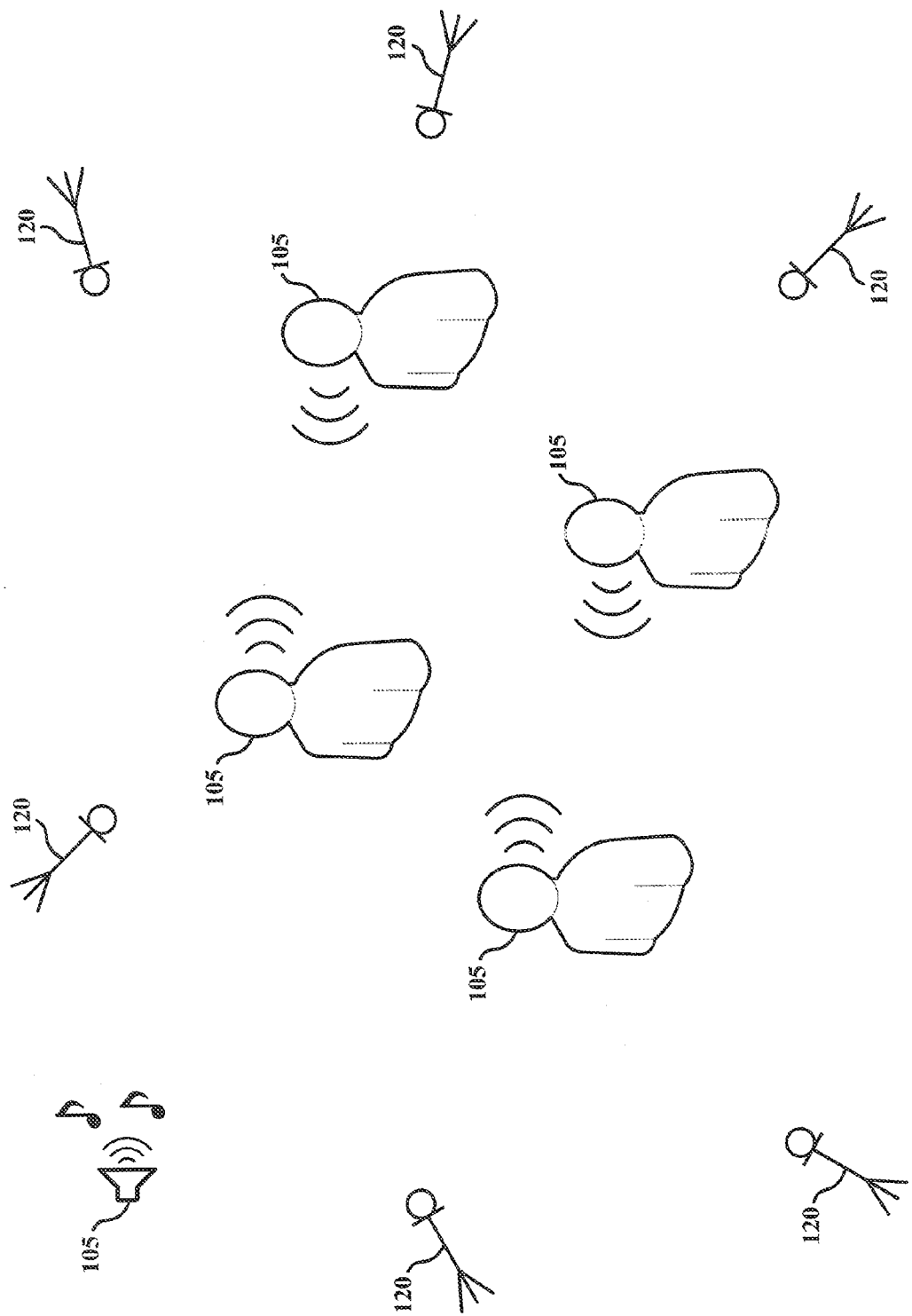
FIG. 1 is a schematic diagram illustrating an example application for self-localization of sensors in a signaling environment according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Overview

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for finding the location of sensors (e.g., microphones) with unknown internal delays based on a set of events (e.g., acoustic events) with unknown event time. A localization algorithm is provided for a set of sensors with unknown internal delays, based on acoustic events with unknown time of occurrence. The algorithm has an iterative character, and the iterations are guaranteed to converge.

As will be described in greater detail below, the present disclosure rewrites the basic equations for travel time between event location and microphone location to got a set of equations for which it is known that the left-hand side is of rank three. The algorithm then iteratively salves for the unknown delay and event-time parameters. The method is guaranteed to converge to the global solution.

In general, sensors, such as microphones in mobile telephones (e.g., Smartphones) and laptop computers, have unknown internal delays. The methods and systems presented herein may be used to self-localize such sensors and the self-localization information may then be used for near-field beam-forming, which allows for selecting between different talkers and reducing environmental acoustic noise. Example applications of the methods and systems described herein include ad-hoc conference calling, group video chat, and the like.

FIG. 1 illustrates an example application for self-localization of sensors (e.g., microphones) in a signaling environment according to one or more embodiments described herein. A plurality of signal sources 105 (e.g., talkers, loudspeakers, etc.) may be located amongst a plurality of sensors (e.g., microphones or other audio input devices).

Self-localization of microphones can use modalities other than sound, such as global positioning systems (GPS) and radio-based systems. However, GPS may not be able to locate the corresponding satellites and may not be sufficiently accurate, while radio-based systems are insufficiently accurate for many applications. Acoustic self-localization promises high accuracy and low cost, and thus offers an attractive approach.

Existing approaches to microphone localization are based on Observing a set of events, and computing unknown locations and time delays from these observations. However, many approaches do not consider the fact that the delay between microphone and observation in the devices (referred to herein as "observation delay") is unknown and often is substantial in practical systems due to buffering. The set of equations that needs to be solved is nonlinear, and iterative approaches that do not exploit the structure of the equations in some fashion generally suffer from a large number of local minima. As a result, some iterative maximum-likelihood approaches, which minimize a mean squared error (MSE), are effective only if a good initial estimate is provided.

Few approaches have been developed that exploit the structure of the equations and do not suffer from finding local minima. Importantly, these methods implicitly do not use a squared-error criterion, and when the observations result in an over-determined set of equations, their output is best used as a good initial estimate for the maximum-likelihood based approaches, which generally results in a further improvement of the estimate.

A first approach makes a "farfield" approximation to render a set of equations that can be solved using a singular value decomposition, leaving a nonlinear problem with only four unknowns (it should be noted that this first approach considers a two-dimensional space only). The method of this first approach is accurate only if the sound events are located far from the microphones.

A second approach rearranges the equations and uses a similar singular value decomposition to finally be left with a nonlinear problem with nine unknown variables. In this second approach, no approximations are made.

The methods and systems of present disclosure exploit the structure of the localization problem in a manner similar to first and second approaches described above. However, in contrast to these approaches, the methods and systems described herein formulate the equations and solutions to include the observation delay. This complicates the problem and leads to an iterative procedure that is guaranteed to converge as will be further described below. For source localization, both the location of the sensors and the observation delays are needed. Accordingly, the methods and systems provided herein allow for computing the event times (e.g., acoustic event times), the observation delays, and the relative locations of the acoustic events and the sensors.

Theory

The following description begins by defining the problem addressed by various embodiments of the disclosure, and then identifies some restrictions on potential solutions to the problem. With the problem defined and potential restrictions identified, the localization algorithm is then derived, as will be further described in the next section.

Consider an acoustic event j occurring at time $\tau_j$ at location $a_j$ and a sensor (e.g., a microphone) i located at $x_i$ with fixed observation delay $d_i$. The distance between the acoustic event location and the sensor location may be related to the travel time by $$\|x_i - a_j\| = t_{ij} - d_i - \tau_j, \quad (1)$$

where $t_{ij}$ is the measured time of arrival of acoustic event j at sensor i. The objective is to compute the $x_i$ and the $d_i$ from a set of equations generated by a number of acoustic events. For a sufficient number of acoustic events and a sufficient number of sensors, the system is overdetermined. In practice there are measurement errors. Therefore, it is natural to minimize the sum of the squared errors, $\Sigma_{i,j} \epsilon_{ij}$, where the scalar error $\epsilon_{ij}$ is defined as $$\|x_i - a_j\| = t_{ij} - d_i - \tau_j + \epsilon_{ij}. \quad (2)$$

By stacking all $\epsilon_{ij}$ into a vector $\epsilon$, and if $\epsilon$ is assumed to have a Gaussian distribution, then minimizing the squared error is the same as maximizing the likelihood of $\epsilon$.

Before starting the derivation, consider the number of sensors and acoustic events required for computing the locations $x_i$ assuming a three-dimensional scenario. A similar evaluation can be made for a two-dimensional scenario. An equation of the form of equation (2) may be used for each sensor/event pair. The number of unknowns has two contributions: a first contribution that is linear with the number of acoustic events J (e.g., the coordinates of the events and the time of their occurrence), and a second contribution that is linear with the number of sensors I (e.g., the coordinates of the sensors and the observation delay). Thus, there are 4J+4I unknowns and JI equations. The system may be solved, at least in principle, if 4J+4I≤JI. However, in practice, the coordinates of a sensor may be computed relative to a selected set of coordinates. Without loss of generality, the first sensor can be selected to have three zero coordinates (e.g., 0, 0, 0 (being the origin)), the second sensor selected to have two zero coordinates, and the third sensor selected to have one zero coordinate. Additionally, the first acoustic event may arbitrarily be set to happen at time zero. As a result, six fewer coordinates need to be computed. In other words, assuming I sensors, $$J \geq \frac{4I-7}{I-4} \quad (3)$$

acoustic events are needed.

Continuing with the above example, for five sensors, thirteen acoustic events are needed. Furthermore, in accordance with at least one embodiment, at least five sensors are always needed. This denominator condition may be understood as follows: any additional acoustic event introduces four more unknowns (e.g., time of the event and three coordinates), and that means such an event should introduce at least five equations to help in determining other variables. Five sensors lead to five equations of the type shown in equation (2). Since in practice there are often estimation errors, more acoustic events than the minimum (e.g., more than thirteen acoustic events) will lead to greater accuracy.

In the above example, the acoustic events, which must be spatially diverse, are generated without knowledge of absolute or relative occurrence time. If some or all of the acoustic events are generated with one device with a single clock by physically moving this device, or with multiple devices that share a clock, then the relative time of occurrence of at least some of the acoustic events will be known. The number of events and devices required can then be reduced from that in the above example. This corresponds to a straightforward modification of equation (3) that is simple to derive for a person skilled in the art. It also leads to straightforward changes in the algorithms below.

Deriving The Algorithm

Deriving the localization algorithm of the present disclosure, in accordance with at least one embodiment described herein, begins with squaring both sides of equation (1):

$$x_i^T x_i - 2 x_i^T a_j + a_j^T a_j = t_{ij}^2 + d_i^2 + \tau_j^2 - 2 t_{ij} d_i - 2 t_{ij} \tau_j + 2 d_i \tau_j \quad (4)$$

Subtracting equation (4) for i=1 from general form of equation (4) leads to:

$$x_i^T x_i - x_1^T x_1 - 2(x_i - x_1)^T a_j = t_{ij}^2 - t_{1j}^2 + d_i^2 - d_1^2 - 2 t_{ij} d_i + 2 t_{1j} d_1 - 2 \tau_j (t_{ij} - t_{1j}) + 2 \tau_j (d_i - d_1) \quad (5)$$

Subtracting equation (5) for j=1 from the general form of equation (5) gives:

$$-2(x_i - x_1)^T (a_j - a_1) = t_{ij}^2 - t_{1j}^2 - t_{i1}^2 + t_{11}^2 - 2 t_{ij} d_i + 2 t_{1j} d_1 + 2 t_{i1} d_i - 2 t_{11} d_1 - 2 \tau_j (t_{ij} - t_{1j}) + 2 \tau_1 (t_{i1} - t_{11}) + 2 (d_i - d_1)(\tau_j - \tau_1) \quad (6)$$

Simplifying gives the following:

$$-2(x_i - x_1)^T (a_j - a_1) = t_{ij}^2 - t_{1j}^2 - t_{i1}^2 + t_{11}^2 - 2 t_{ij}(d_i + \tau_j) + 2 t_{1j}(d_1 + \tau_j) + 2 t_{i1}(d_i + \tau_1) - 2 t_{11}(d_1 + \tau_1) + 2 (d_i - d_1)(\tau_j - \tau_1). \quad (7)$$

In equation (7), the variables $x_i$, $d_i$, $a_j$, and $d_j$ are unknown and must be solved for. Accordingly, define the (J−1)×3 matrix $$A = \begin{bmatrix} a_2 - a_1 \\ a_3 - a_1 \\ \vdots \\ a_J - a_1 \end{bmatrix}, \quad (8)$$

the (I−1)×3 matrix $$X = \begin{bmatrix} x_2 - x_1 \\ x_3 - x_1 \\ \vdots \\ x_I - x_1 \end{bmatrix}, \quad (9)$$

and the (I−1)×(J−1) matrix $$T = \begin{bmatrix} t_{22}^2 - t_{12}^2 - t_{21}^2 + t_{11}^2 & t_{23}^2 - t_{13}^2 - t_{21}^2 + t_{11}^2 & \cdots \\ t_{32}^2 - t_{12}^2 - t_{21}^2 + t_{11}^2 & t_{33}^2 - t_{13}^2 - t_{31}^2 + t_{11}^2 & \cdots \\ \vdots & \vdots & \ddots \end{bmatrix}. \quad (10)$$

With the above matrices (8), (9), and (10), the unknown delays and the event times (the $d_i$ and $\tau_j$) can be stacked in a single vector p and the following can be written:

$$-2XA^T = T + G(p) \quad (11)$$

where G(p) is a nonlinear matrix function of p. As the (I−1)×(J−1) matrix $XA^T$ has rank three, the right-hand side T+G(p) must also have rank three, and this can be used to determine the unknown $d_i$ and $\tau_j$: the aim is to determine a rank-three approximation of T+G(p). This problem is generally referred to as a structured low-rank approximation (SLRA) problem. The particular example presented above is a non-linear SLRA problem, which implies that a limited amount of theory exists. However, as will be described in greater detail below, the present disclosure provides an iterative approximation algorithm.

It is important to note that one of the values $d_i$ and $\tau_j$ is arbitrary. This arbitrary value corresponds to the definition of the origin of time. In at least the present example, it is appropriate to select $\tau_1=0$.

The process of deriving an iterative approximation algorithm may begin by constructing a straightforward algorithm based on the Eckart-Young-Mirsky theorem. This theorem states that, if the Frobenius norm is used as criterion, the best N×M matrix B rank r approximation is $U_1 \Lambda_1 V_1$ where $$B = U \Lambda V$$
$$= [U_1 U_2] \begin{bmatrix} \Lambda_1 & 0 \\ 0 & \Lambda_2 \end{bmatrix} [V_1, V_2]$$

is the singular-value decomposition of B.

Algorithm A

According to at least one embodiment, the localization algorithm derived herein, which is referred to as "Algorithm A," may proceed as follows:

1. Measure $\{t_{ij}\}_{i \in 1 \ldots J, j \in 1 \ldots J}$;
2. Set iteration number: n=0 and assume $\tau_j=0$, and set the scalar convergence threshold q for Step 9 below;
3. Select a set $\{d_i\}_{i \in 1 \ldots I}$ and $\{\tau_j\}_{j \in 1 \ldots J}$, together they form $p^{(n)}$;

4. Construct $B^{(n)}=T+G(p^{(n)})$;

5. Determine the rank-3 approximation $B_{(3)}^{(n)}=U_1\Lambda_1 V_1$ of $B^{(n)}$ (retain only the largest three diagonal elements of $\Lambda_1$);

6. Compute $C^{(n)}=B_{(3)}^{(n)}-T$;

7. Stack the elements of $C^{(n)}$ into a $(I-1)(J-1)\times 1$ vector $c^{(n)}$ and stack the elements of $G(p^{(n+1)})$ in the vector $$g(p^{(n+1)}) = [W_1 W_2]\begin{bmatrix}d^{(n+1)}\\ \tau^{(n+1)}\end{bmatrix}+\gamma,$$

where $d^{(n+1)}$ is an I+1 vector of $d_i$ and $\tau^{(n+1)}$ is a $(J-1)\times 1$ vector of $\tau_j$ (e.g., $\tau=[\tau_2^{(n+1)},\ldots,\tau_J^{(n+1)}]$), and where $\gamma$ is the stacking of the $(I-1)(J-1)\times 1$ matrix $d\tau^T$ in a vector.

8. Minimize $(c^{(n)}-g(p^{(n+1)}))^2$ and find $p^{(n+1)}$. This may be a convex problem and conventional methods such as Newton's method may be used to find a solution. If the delays can be and are approximated as all being equal, then the nonlinear term $\gamma$ may be omitted and a (possibly over-specified) linear problem results. In such an instance, the linear problem may be solved using the inverse or pseudo-inverse of $[W_1 W_2]$;

9. Compute the Frobenius norm $\|C^{(n)}-G(p^{(n+1)})\|_F^2$. Convergence is defined as its value being within the defined threshold q. If not converged, set $n\to n+1$ and return to Step (4) above.

10. Determine X and A by finding the matrix Z in $X=UZ$ and $-2A^T=Z^{-1}\Lambda V$ that minimizes equation (2).

Figure 2:
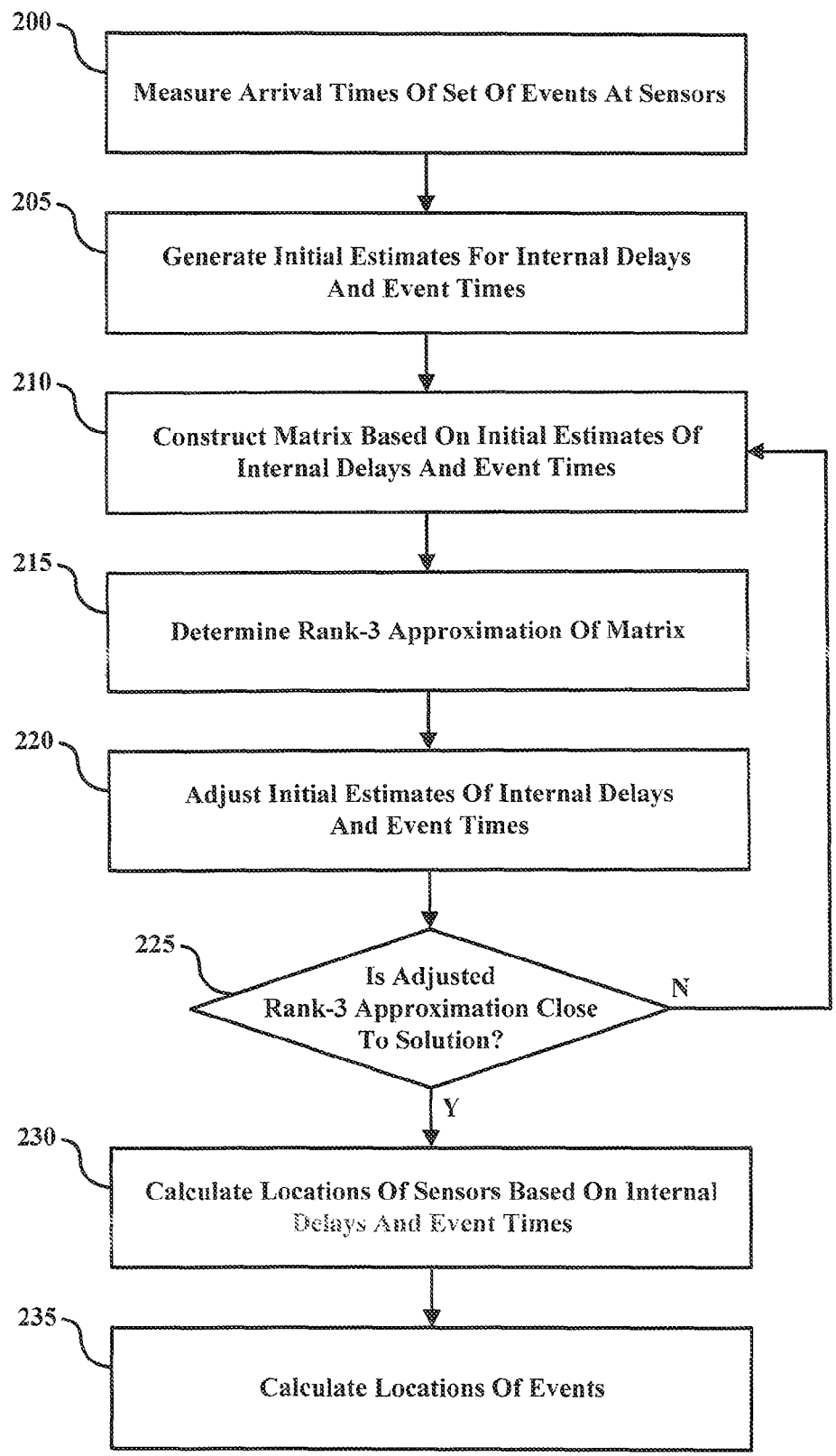
FIG. 2 is a flowchart illustrating an example of a method for finding the location of sensors with unknown internal delays based on a set of events with unknown event times according to one or more embodiments described herein.

FIG. 2 illustrates the process of Algorithm A described above. At block 200, the algorithm measures the arrival times of a sufficient set of acoustic events at the sensors (e.g., sensors 120 as shown in FIG. 1).

At block 205, initial estimates for the internal delays and the acoustic event times may be generated. With the estimates generated in block 205, a matrix may be constructed at block 210, where the matrix is a trial right-hand side for equation (11), presented above.

It is known that a good version of the right-hand side of equation (11) would be rank-3 (that is, the column space can be described by three vectors only, and the same holds for the row space). Therefore, at block 215, the closest rank-3 matrix (e.g., according to the Frobenius norm) to the trial matrix may be found. This closest rank-3 matrix may be identified as $B_{(3)}^{(n)}$.

At block 220, the initial estimates for the internal delays and the acoustic event times may be adjusted such that the right-hand side of equation (11) approximates $B_{(3)}^{(n)}$ as well as possible using, for example, the Frobenius norm.

At block 225, a determination may be made as to whether the adjusted right-hand side of equation (11) has converged to the correct answer with sufficient accuracy based on comparison to the convergence threshold. If not, the process may return to block 210 for the next iteration in which a new rank-3 approximation of the new right-hand side of equation (11) may be computed. The final result of the iterative process involving blocks 210 through 225 is a set of reasonable internal delays and acoustic event times.

At block 230, the internal delays and acoustic event times produced from the iterative process of blocks 210 through 225 may be used to compute the locations of the sensors and the locations of the acoustic events.

Step 10 of Algorithm A, described above, may be performed with a gradient algorithm that minimizes the error in a Frobenius norm. As there are only nine variables, the probability of getting stuck in a local minimum is relatively small.

Algorithm A is guaranteed to converge. For each step the algorithm tries to minimize the criterion $\|B^{(n)}-B_{(3)}^{(n)}\|$. It follows from the optimization that $$\|C^{(n)}-G(p^{(n+1)})\|_F^2 \leq \|C^{(n)}-G(p^{(n)})\|_F^2 \quad (12)$$

and, therefore, $$\|B_{(3)}^{(n)}-B^{(n+1)}\|_F^2 \leq \|B_{(3)}^{(n)}-B^{(n)}\|_F^2 \quad (13)$$

The Eckart-Young-Mirsky theorem dictates that $\|B_{(3)}^{(n+1)}-B^{(n+1)}\|_F^2 \leq \|B_{(3)}^{(n)}-B^{(n+1)}\|_F^2$, and so Algorithm A must converge.

In practice, Algorithm A often converges very slowly and remains far away from the final solution over many iterations. However, it is possible to correct this problem by adding to the criterion $$\|B^{(n)}-B_{(3)}^{(n)}\|_F^2 = \|T+G(p)-B_{(3)}^{(n)}\|_F^2 \quad (14)$$

Another term that moves the $p^{(n)}$ vector into the region where the solution is known to be. From the left-hand side of equation (11) it is clear that components of $B^{(n)}=T+G(p)$ must be reasonably small: the solution should be near the origin. This implies that the Frobenius norm $\|T+G(p)\|_F^2$ should be reasonably small. Therefore, the criterion $\|B^{(n)}-B_{(3)}^{(n)}\|_F^2+\lambda\|T+G(p)\|_F^2$ may be minimized at each step of the algorithm. The criterion at each step is then $$\eta_{(n)} = \|T+G(p)-B_{(3)}^{(n)}\|_F^2+\lambda\|_F^2+\lambda\|T+G(p)\|_F^2 \quad (15)$$

Algorithm B

According to at least one embodiment, the revised version of the localization algorithm is provided below as "Algorithm B." It should be noted that some of the steps of Algorithm B parallel those of Algorithm A, described above. The details of such steps are omitted in the following description of Algorithm B for purposes of brevity.

1. Measure $\{t_{ij}\}_{i\in 1\ldots I, j\in 1\ldots J}$;

2. Set iteration number: $n=0$ and assume $\tau_1=0$, and set the scalar convergence threshold q for Step 9 below;

3. Select a set $\{d_i\}_{i\in 1\ldots I}$ and $\{\tau_j\}_{j\in 1\ldots J}$, together they form $p^{(n)}$;

4. Construct $B^{(n)}=T+G(p^{(n)})$;

5. Determine the rank-3 approximation $B_{(3)}^{(n)}=U_1\Lambda_1 V_1$ of $B^{(n)}$ (retain only the largest three diagonal elements of $\Lambda_1$);

6. Compute $C^{(n)}=B_{(3)}^{(n)}-T$;

7. Stack the elements of $C^{(n)}$ into a $(I-1)(J-1)\times 1$ vector $c^{(n)}$, stack the elements of $G(p^{(n+1)})$ in the vector $$g(p^{(n+1)}) = [W_1 W_2]\begin{bmatrix}d^{(n+1)}\\ \tau^{(n+1)}\end{bmatrix}+\gamma,$$

and stack the elements of T in t.

8. Minimize $(c^{(n)}-g(p^{(n+1)}))^2+\lambda(t+g(p))^2$ and find $p^{(n+1)}$. This is again a convex problem and conventional methods such as Newton's method may be used to find a solution.

9. Compute the criterion $\|T+G(p)-B_{(3)}^{(n)}\|_F^2+\lambda\|T+G(p)\|_F^2$. If lot smaller than convergence threshold q, then set $n\to n+1$ and return to step (4) above.

10. Determine X and A by finding the matrix Z in $X=UZ$ and $-2A^T=Z^{-1}\Lambda V$ that minimizes equation (2).

As compared to Algorithm A, it is found in practice that Algorithm B converges quickly for reasonable settings of $\lambda$.

Algorithm B may be run by itself. However, it should be noted that the criterion does not minimize a natural squared error criterion, but rather a criterion that was selected to facilitate finding a global optimum. In a scenario where more accurate localization is needed, the global solution obtained with Algorithm B may be used (or with Algorithm A) as an initial value for certain iterative maximum-likelihood approaches that minimize a squared error criterion. As such, the overall algorithm may proceed as follows:

1. Run Algorithm B until convergence; and
2. Run an iterative maximum-likelihood algorithm to find the global minimum.

It should be reiterated that although the algorithm and methods of the present disclosure are illustrated for acoustic events and audio sensors, such algorithms and methods may also be used in various other contexts, such as radio.

Figure 3:
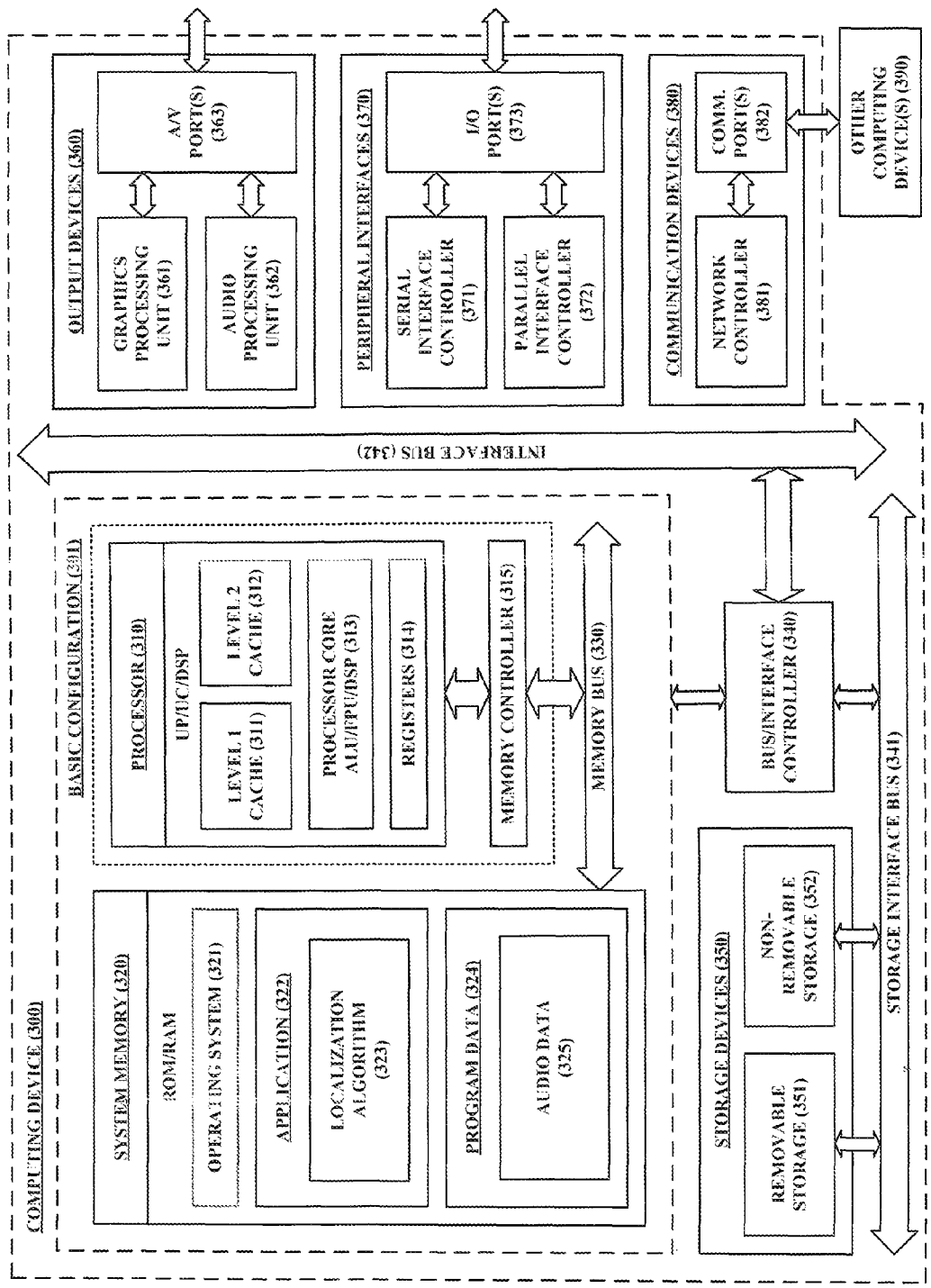
FIG. 3 is a block diagram illustrating an example computing device arranged for finding the location of a set of sensors with unknown internal delays based on a set of events with unknown event times according to one or more embodiments described herein.

FIG. 3 is a block diagram illustrating an example computing device 300 that is arranged for finding the location of sensors (e.g., microphones) with unknown internal delays based on a set of events (e.g., acoustic events) with unknown event time in accordance with one or more embodiments of the present disclosure. For example, computing device 300 may be configured to iteratively run a localization algorithm that converges on the global solution for the unknown delay and event-time parameters, as described above. In a very basic configuration 301, computing device 300 typically includes one or more processors 310 and system memory 320. A memory bus 330 may be used for communicating between the processor 310 and the system memory 320.

Depending on the desired configuration, processor 310 can be of any type including but not limited to a microprocessor (μP), a microcontroller (μC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 can also be used with the processor 310, or in some embodiments the memory controller 315 can be an internal part of the processor 310.

Depending on the desired configuration, the system memory 320 can be of any type including but not limited to volatile memory (e.g., RAM), non-volatile memory (e.g., ROM, flash memory, etc.) or any combination thereof. System memory 320 typically includes an operating system 321, one or more applications 322, and program data 324. In at least some embodiments, application 322 includes a localization algorithm 323 that is configured to determine locations of a set of microphones with unknown internal delays based on a set of acoustic events with unknown event time. The localization algorithm 323 may be configured to iteratively solve for the unknown delay and event-time parameters, and thereby converge to the global solution.

Program Data 324 may include audio data 325 that is useful for measuring the arrival times of a sufficient set of acoustic events at a set of devices audio input devices 120 as shown in FIG. 1). In some embodiments, application 322 can be arranged to operate with program data 324 on an operating system 321 such that the localization algorithm 323 uses the audio data 325 to generate estimates for the internal delays and the acoustic event times, which may be used to construct a matrix representative of a trial right-hand side for equation (11), and then iteratively run to converge to the global solution, as described above.

Computing device 300 can have additional features and/or functionality, and additional interfaces to facilitate communications between the basic configuration 301 and any required devices and interfaces. For example, a bus/interface controller 340 can be used to facilitate communications between the basic configuration 301 and one or more data storage devices 350 via a storage interface bus 341. The data storage devices 350 can be removable storage devices 351, non-removable storage devices 352, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 320, removable storage 351 and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media can be part of computing device 300.

Computing device 300 can also include an interface bus 342 for facilitating communication from various interface devices (e.g., output interfaces, peripheral interfaces, communication interfaces, etc.) to the basic configuration 301 via the bus/interface controller 340. Example output devices 360 include a graphics processing unit 361 and an audio processing unit 362, either or both of which can be configured to communicate to various external devices such as a display or speakers via one or more A/V ports 363. Example peripheral interfaces 370 include a serial interface controller 371 or a parallel interface controller 372, which can be configured to communicate with external devices such as input devices (e.g., keyboard, mouse, pen, voice input device, touch input device, etc.) or other peripheral devices (e.g., printer, scanner, etc.) via one or more I/O ports 373.

An example communication device 380 includes a network controller 381, which can be arranged to facilitate communications with one or more other computing devices 390 over a network communication (not shown) via one or more communication ports 382. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following; a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the at to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
   measuring observation times of a set of events at a set of sensors;
   generating initial estimates for internal delays of the sensors and event times of the events;
   performing an iterative approximation algorithm to find a rank-3 approximation of the internal delays and event times using a criterion; and
   computing locations of the sensors using the rank-3 approximation of the internal delays and event times.

2. The method of claim 1, wherein the set of events is a set of acoustic events, and the set of sensors is a set of microphones.

3. The method of claim 2, wherein one or more of the acoustic events is generated by human with hand claps or speech.

4. The method of claim 2, wherein one or more of the acoustic events is generated by a device with a loudspeaker.

5. The method of claim 4, wherein the device is a telephone.

6. The method of claim 1, wherein one or more of the sensors are microphones located on mobile telephones.

7. The method of claim 1, wherein the localization of the sensors is for the purpose of near-field beam-forming.

8. The method of claim 1, wherein the localization of the sensors is used to identify talkers in a conference call.

9. The method of claim 1, wherein the localization of the sensors is used as a basis for the enhancement of recorded audio signals.

10. The method of claim 1, further comprising using the locations of the sensors to determine locations of one or more mobile telephones.

11. The method of claim 1, further comprising computing locations of the acoustic events using the rank-3 approximation of the internal delays and event times.

12. The method of claim 1, wherein the iterative approximation algorithm converges to a global solution for the internal delays and the event times.

13. The method of claim 12, further comprising using the global solution as an initial value for an iterative maximum-likelihood algorithm to find a global minimum.

14. The method of claim 12, further comprising using the global solution as an initial value for an iterative maximum-likelihood algorithm to minimize a squared error criterion.

15. The method of claim 1, wherein the criterion is selected to facilitate finding a global solution.

16. The method of claim 1, wherein the criterion is the Frobenius norm.

17. The method of claim 1, wherein each step of the iterative approximation algorithm minimizes the criterion.

18. The method of claim 17, wherein the criterion is the Frobenius norm.

* * * * *